May 29, 1962 P. L. GLOCKER 3,036,693
METHOD AND DEVICE FOR TRANSPORTING WORKPIECES
Filed April 4, 1960 2 Sheets-Sheet 1
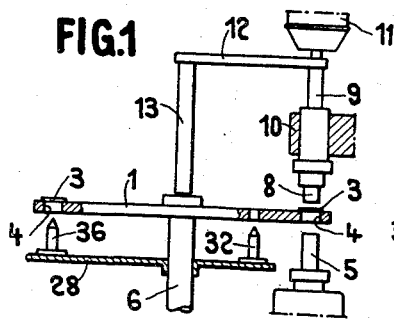
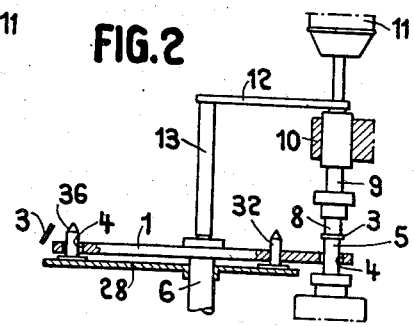
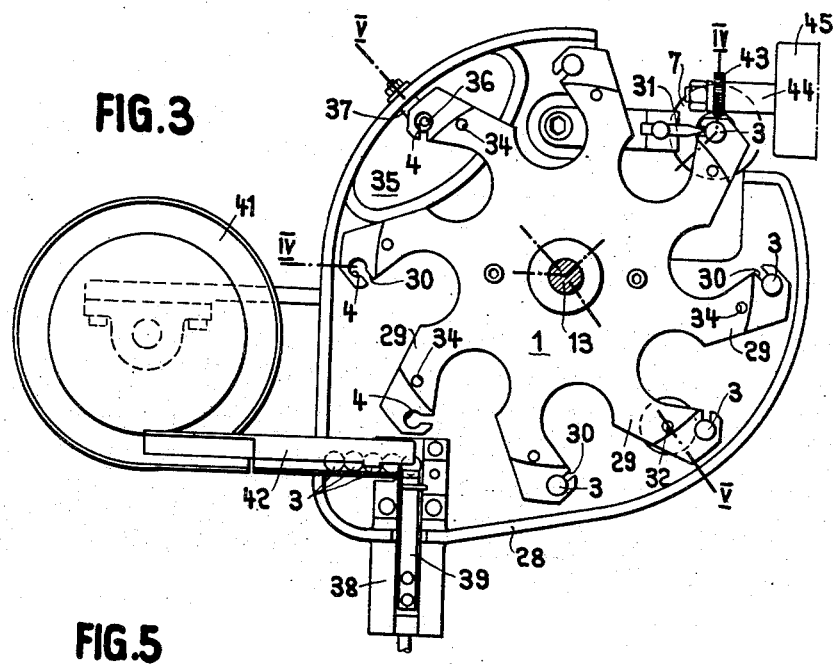
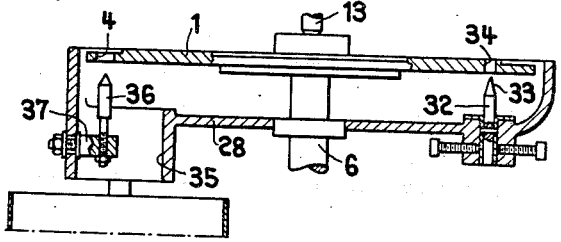
INVENTOR
Paul L. Glocker
BY
*Imirie & Smiley*
ATTORNEYS May 29, 1962  P. L. GLOCKER  3,036,693
METHOD AND DEVICE FOR TRANSPORTING WORKPIECES
Filed April 4, 1960  2 Sheets-Sheet 2
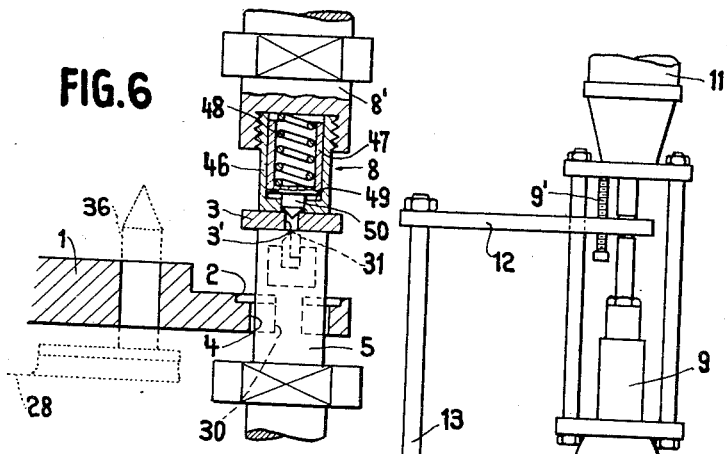
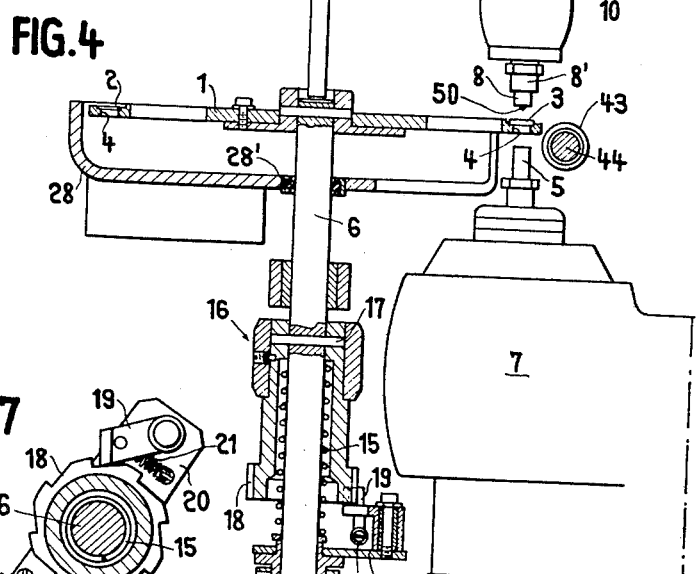
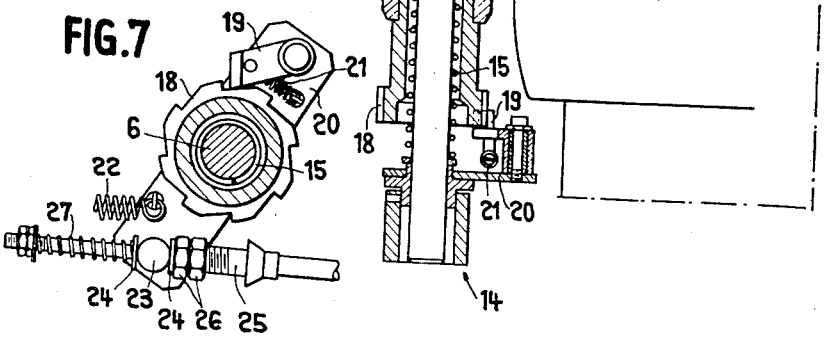
INVENTOR
Paul L. Glocker
BY
*Imrie & Smiley*
ATTORNEYS

United States Patent Office 3,036,693
Patented May 29, 1962

3,036,693
METHOD AND DEVICE FOR TRANSPORTING WORKPIECES
Paul L. Glocker, Jurastrasse 88, Grenchen, Switzerland
Filed Apr. 4, 1960, Ser. No. 19,661
Claims priority, application Switzerland Apr. 10, 1959
8 Claims. (Cl. 198—25)

This invention relates to a method and device transporting work pieces to a working position, particularly in a machine tool wherein the workpiece is to be treated in its said working position.

One problem in machines of this kind resides in the necessity that working of the workpiece by means of any desired tools in its working position should not be hindered by the means used previously for transporting the workpiece into its working position wherein it is usually maintained in a clamping device. Therefore, in hitherto known machines swinging arms or the like have been provided for advancing the workpiece to its working position, such arms or other transporting members being retracted when the workpiece has properly been clamped or spanned in its working position. This means is complicated in construction and slow in operation.

It was further proposed to feed workpieces into a working position by rotation of a turntable comprising proper clamping means for the workpieces. This is proper for workpieces to be worked in stationary condition. However, when the workpiece has to be treated in rotating condition or when the workpiece has to be moved in any other manner during its treatment by tools, separate clamping means have to be provided which cannot properly be mounted on the turntable.

This invention is based on the well known use of a turntable for feeding the workpieces towards their working position, but to provide clamping means independent of the turntable for clamping the workpieces transported between them by the turntable and for simultaneously spacing the workpiece from the turntable so that free access for the tools to the workpiece is obtained without interference between the tools and the turntable. Therefore, this invention broadly bases on the fact that the workpieces are fed between clamping means by a very simple turntable just adapted for transport of workpieces loosely deposited thereon and that the workpieces so advanced between the clamping means are simultaneously clamped by such clamping means and spaced from the turntable. It will be shown in the following with reference to the accompanying drawings that this simultaneous clamping and spacing of the workpiece is possible with extremely simple movements and means. Further objects and advantages will equally resort from the following specifications and attached drawings wherein FIGS. 1 and 2 are schematical illustrations of one embodiment of the invention allowing explanation of the principles of the invention without showing details, of secondary importance, FIG. 3 is a top view of the device,
FIG. 4 is a section along line IV—IV in FIG. 3,
FIG. 5 is a section along line V—V in FIG. 3,
FIG. 6 is an elevation partially in section of the clamping means of the device, and
FIG. 7 shows the step drive of the turntable.

Similar parts are equally designated in the schematical FIGS. 1 and 2 and the other, more specific illustrations.

The device has a flat turntable 1 with regularly spaced flat recesses 2 (FIG. 6) serving as holding means for flat, disc-shaped workpieces 3 to be transported by the turntable, the diameter of such workpieces being somewhat smaller than the diameter of recesses 2 so that such workpieces will loosely be held in such recesses without appreciable radial clearance. Bores or apertures 4 of smaller diameter are concentrically disposed below recesses 2 such bores being sufficiently small for retaining the workpieces on the shoulders formed between recesses 2 and bores 4, but such bores being sufficiently wide for allowing a clamping head 5 to penetrate through the turntable from below. The turntable 1 is rotatably mounted by means of a shaft 6. Clamping head 5 is rotatably mounted in a lower stationary machine part 7 and may be driven by means not shown in the drawing. Clamping head 5 is not axially displaceable. An upper clamping head 8 is mounted for free rotation on a column 9 axially displaceable in an upper fixed machine part 10. Column 9 may be shifted downwards by applying pressure into a cylinder 11 and it is displaced upwards by spring means not shown when the operating pressure is removed.

A support 12 fixed to column 9 carries a vertical rod 13 coaxially disposed with and contacting the upper end of the turntable shaft 6. The lower end of shaft 6 engages a bearing assembly 14. A pressure spring 15 inserted between bearing assembly 14 and a sleeve structure 16 fixed on shaft 6 by means of a pin 17 tends to shift shaft 6 upwards so that the upper end of shaft 6 is continuously maintained in contact with the lower end of rod 13. Therefore the axial position of shaft 6 and the turntable 1 is always determined by the axial position of rod 13 and column 9 respectively.

At its lower end the sleeve assembly 16 has a step gear 18 also seen in FIG. 7. A step pawl 19 mounted on a lever 20 pivoted on shaft 6 is maintained in engagement with toothed gear 18 by a spring 21. A spring 22 tends to rotate lever 20 in clockwise direction as seen in FIG. 7. A pin 23 fixed on lever 20 is engaged between washers 24 mounted on an actuating rod 25. The position of one of washers 24 may precisely be adjusted by means of nuts 26 and the other of washers 24 is urged against pin 23 by a pressure spring 27.

Turntable 1 is disposed in a cupshaped tray 28 having a sealing ring 28' for shaft 6. As shown in FIG. 3 the turntable 1 has teeth 29 wherein the recesses 2 and bores 4 are provided, and small slits 30 extend from each recess 2 and bore 4 to the nearer edge of the tooth 29. It will later be explained that this slit 30 allows access of a tool 31 mounted on the bottom of tray 28 to a workpiece to be treated in the device.

As shown in FIG. 5 an orienting pin 32 having a conical upper end 33 is fixed at the bottom of tray 28. The turntable 1 has holes 34 in each of its teeth 29 cooperating with the orienting pin 32 in a manner explained later on. A canal 35 passes through the bottom of tray 28 and an ejecting pin 36 is mounted by means of a carrier 37 on a side wall of tray 28.

A charging unit 38 is fixed in a proper place of tray 28, this charging unit having a slider 39 displaceable in the direction of its longitudinal extension by means not shown. The inner end of slider 39 is in alignment with a recess 2 of turntable 1 when the turntable 1 is in one of its eight operating positions determined by the step gear 18 and orienting pin 32 respectively. A vibrating conveyor 41 of any usual type is fixed at the side of tray 28 and work pieces 3 are continuously fed through a canal 42 to the fore end of the charging unit 38. When the slider 39 is displaced inwardly from its rest position shown in FIG. 3 the foremost of workpieces 3 is pushed out onto the turntable 1 and into the recess 2.

A tool 43 for instance a grinder is fixed on a driving shaft 44 pivoted in a machine part 45 adapted for displacement in the direction of the arrow shown in FIG. 3. The upper clamping head 8 is shown on a larger scale and partially in section in FIG. 6. It is assumed that the workpiece 3 has a central hole 3'. The upper clamping head 8 has a sleeve 46 screw-fastened to an upper head portion 8' rotatably mounted on column 9. Another sleeve 47 is axially displaceable in sleeve 46 and a pressure spring 48 inserted between portion 8' and the bottom of sleeve 47 tends to shift sleeve 47 to a lower end position wherein its bottom engages a shoulder 49 of sleeve 46. A centering pin 50 is fixed at the bottom of sleeve 47 and extends through a hole in the bottom of sleeve 46. When the upper clamping head 8 engages a workpiece 3 as shown in FIG. 6, the conical lower end of pin 50 engages the bore 3' of the workpiece and brings the workpiece 3 into precise axial alignment with the coaxially disposed clamping heads 5 and 9.

Operation of the machine will now be described with particular reference to the simplified FIGS. 1 and 2. FIG. 1 shows a position wherein the turntable 1 and clamping head 8 are raised to an upper end position wherein the turntable is disengaged from the orienting pin 32 and ejecting pin 36 and is freely rotatable between clamping heads 5 and 8. It is assumed that the turntable has just been advanced in anticlockwise direction as seen in FIG. 3 by operation of the step drive shown in FIG. 7. During this advancing motion the actuating rod 25 is moved to the right in FIG. 7 whereby this displacement is transmitted to lever 20 and step pawl 19 through spring 27 so that a flexible coupling is formed between the step drive and the actuating means thereof. The stepping rotation of lever 20 is limited by a fixed stop not shown, and spring 27 will be compressed when lever 20 is stopped before displacement of rod 25 is stopped. It is further assumed that each of the workholders 2 is charged with a workpiece 3 when stepwise advanced into alignment with the charging unit 38. Therefore, a raw workpiece 3 loosely supported in one of the recesses 2 will be brought into the common axis of clamping heads 5 and 8 whenever the turnable is lifted to the position shown in FIG. 1 and is advanced by one step. It is seen in FIG. 4 that the axial width of the step gear 18 and the step pawl 19 are so designed that these parts remain in engagement for any axial position of the turntable 1.

When a new raw workpiece has been brought into the common axis of heads 5 and 8, that is into the working axis, as mentioned above, pressure is now admitted to the cylinder 11 so that column 9 is lowered against spring action from its upper end position determined by a stop screw 9' shown in FIG. 4. This lowering movement is transmitted to rod 13 and therefore to shaft 6 and turntable 1, these parts being thereby lowered against the action of spring 15. During this common downward motion of parts 1 and 8, the orienting pin 32 will first engage a bore 34 roughly brought into alignment therewith during the last step advance of turntable 1, and will precisely determine the angular position of turntable 1 relatively to the axis of heads 5 and 8. Somewhat later the ejecting pin 36 will engage a workpiece that has been treated previously and will eject it into canal 35 through which it falls into a container.

Meantimes the turntable has been lowered to the level of the lower clamping head 5 so that this head will now enter the bore 4 and during the further downward motion of turntable 1 the workpiece 3 will be deposited on the lower clamping head 5 penetrating through the turntable. The turntable 1 is further lowered and is thereby spaced from the workpiece. Eventually the centering pin 50 of the upper clamping head 8 will engage the bore of the workpiece loosely supported on clamping head 5 and will precisely adjust the workpiece into concentrical position with heads 5 and 8. Somewhat later the clamping surface of head 8 formed at the bottom of sleeve 46 will engage the workpiece and the workpiece is firmly clamped between heads 5 and 8 with a pressure adjustably by admission of suitable pressure to cylinder 11. When the workpiece is firmly clamped between heads 5 and 8 further downward motion of column 9 and of the turntable 1 is stopped.

The tool 43 is now advanced against the workpiece 3 for instance for cutting a gear toothing at the edge of the workpiece, to which end head 5 and shaft 44 are driven with precisely synchronized speeds. Simultaneously with the gear cutting, burrs produced at the lower side of the edge of the workpiece are removed by the tool 31. It will be seen that during the previously described downward motion of the turntable 1 the tool 31 penetrates into and through the slit 30 formed in the turntable. It is further illustrated in FIG. 4 in dotted lines that the turntable gives free access of the tools to the workpiece when in its lower end position. Of course any other tools than those described by way of example may be used.

When the workpiece has been finished in the manner indicated, pressure is removed from the cylinder 11 so that the shaft 6, turntable 1, rod 13, support 12, column 9 and upper clamping head 8 are commonly lifted by spring 15. Thereby the upper clamping head will first leave the workpiece and the same remains loosely supported on the lower clamping head 5, until it is lifted off by the shoulders of recess 2 of the raising turntable. Meantimes the turntable has also been disengaged of pins 32 and 36 and may now be advanced by one step in the manner set out above. Thereby the treated workpiece which has just been lifted off the lower clamping head 5 is transported by one step towards the ejecting place and will be ejected after the next advance of the turntable. Further, another raw workpiece has been transported into the working axis between clamping member 5 and 8 and will be handled in the manner just described when the turntable and the parts mechanically coupled therewith are subsequently lowered again as described above.

Of course other tools may be used as mentioned above, and other workpieces may be handled, the workholders of the turntable and the clamping means being adapted to such tools and workpiece shape. If the workpiece has to be worked in stationary condition, the clamping members may be adapted for axial displacement only but not for rotation. Exchangeable workholders and exchangeable clamping means may be provided for one standard machine for allowing adaptation of the machine for different work. Further the turntable itself may be adapted for easy exchange. A testing apparatus may be inserted between the working axis and the ejector for testing finished workpieces arriving in the intermediate position of the turntable between the working station and the ejector station. Faulty workpieces may be ejected in the testing apparatus. Instead of eight workholders any other number, preferably at least three workholders may be provided whereby the advance of the turntable is done by suitable angular steps.

Other clamping means may be provided for clamping the workpiece and for spacing it from the turntable. It is not necessary that such clamping means are displaceable in a common axis, particularly when no rotation of the workpiece in its clamped position is required, and the clamping means may execute rotating instead of translatory motions.

While in the preferred embodiment shown in the drawing, clamping of the workpiece and spacing thereof from the turntable is done by a simple common relative motion of the turntable and of one clamping member relatively to the other clamping member, this relative motion may be reversed in that the turntable and one clamping member are not axially displaceable while the other clamping member is axially displaceable for penetrating through the turntable, lifting the workpiece off the turntable and transporting it against the other clamping member. For instance it is easily seen in FIG. 1 that an upward motion of head 5 would give the same result as a common downward motion of turntable 1 and clamping head 8. However, the embodiment shown in the drawing is preferred because it is much simpler to displace the turntable and one clamping head instead of displacing the other clamping head the tool 31 the orienting pin 32 and the ejecting pin 36.

What I claim is:

1. A device for transporting workpieces to a working position in a machine, comprising a pair of clamping members relatively displaceable along a common axis for clamping the workpiece in its working position between such clamping members and a turntable or rotary carrier, means for advancing workpieces into the common axis of the said clamping members by rotation of the said turntable while such clamping members are maintained axially spaced from each other, means for axially displacing the said turntable towards one of the said clamping members, thereby depositing the workpiece on this one clamping member and for axially displacing the turntable in the same direction beyond the so deposited workpiece so that the workpiece is spaced from the turntable, and means for axially approaching the said clamping members for clamping the workpiece in its working position spaced from the turntable.

2. A device for transporting workpieces to a working position, comprising a pair of clamping members relatively displaceable for clamping the workpiece in its working position and a turntable or rotary carrier, means for depositing workpieces on the said turntable, means for advancing individual workpieces into a position between the said clamping members by stepwise rotation of the turntable, while such clamping members are maintained in a position spaced from the turntable and workpiece deposited thereon, means for producing a relative displacement between the said turntable and one of the said clamping members substantially in the direction of the rotating axis of the turntable for depositing the said workpiece on this one clamping member and for axially spacing the workpiece so deposited on the one clamping member from the turntable whereby the said one clamping member passes through the turntable, and means for approaching the said clamping means against each other for clamping the workpiece in its working position which is spaced from the turntable and wherein tools have free access to the workpiece without mechanical interference with the turntable.

3. A device for transporting workpieces to a working position in a machine, comprising a pair of clamping members adapted for relative displacement, an open position of such clamping members and a closed position of such clamping members wherein a workpiece may be clamped between such clamping members, a disc-shaped turntable having opposite faces and adapted for stepwise advance and having holding means for receiving workpieces on one face thereof and apertures passing through the said turntable from the said holding means to the other of the said turntable faces, a step drive for stepwise advance of the said turntable into a number of angular positions, the said clamping members being so disposed relatively to the turntable that one of the said clamping members is able to penetrate the said turntable through one of its said apertures from the said other face towards the said holding means, means for relative displacement of the said turntable and the said one clamping member in a direction substantially perpendicular to the plane of the turntable whereby the one clamping member penetrates one of the said apertures whereby a workpiece deposited in the said holding means is deposited on the said one clamping member and is positively removed from the said holding means and spaced from the turntable respectively into its working position by the said one clamping member, and means for relative displacement of the said clamping means for clamping the said workpiece in its said working position, tool means adapted for working the said workpiece in its said working position, the said turntable, the said tool means and the said spacing of the workpiece in its working position being so disposed that the turntable does not interfere with the said tool means.

4. A device according to claim 3, comprising means operable for orienting the said turntable in a number of predetermined angular operating positions, and means for rendering such orienting means operative prior to deposition of the workpiece on the said one clamping member.

5. A device according to claim 4, comprising fixed orienting means and an axially displaceable turntable, the turntable engaging such orienting means prior to deposition of the workpiece on the said one clamping member.

6. A device according to claim 3, the said turntable comprising at least three hodling means for one workpiece each, charging means for successively feeding individual workpieces into each of the said holding means, and means for ejecting workpiece from such holding means after treating such workpiece, the said angular positions of the turntable being so defined that for each of such positions one of the said holding means is near the said charging means for being charged with a workpiece, one of the said holding means is near the said clamping means, and one of the said holding means is near the said ejecting means, the said ejecting means being operable upon axial displacement of the turntable.

7. A device for transporting workpieces to a working position, comprising a disc-shaped turntable having opposite faces and holding means for receiving workpieces on one face thereof and apertures passing through the said turntable from the said holding means to the other of said turntable faces, a pair of clamping members operable for clamping a workpiece, an open position of such clamping members wherein such clamping members are spaced from the said turntable at opposite sides thereof, a stepping device for the said turntable for stepwise rotation thereof into a number of predetermined positions, one of the said holding means and one of the said apertures of the turntable being substantially in a common line with the said clamping members for each of said predetermined positions, means for axial displacement of the said turntable, a first of said clamping members being mechanically coupled with the said means for axial displacement of the turntable so that the said first clamping member and the turntable are adapted for common axial displacement relatively to a second of the said clamping members which is unable of axial displacement, the said second clamping member penetrating through one of said apertures, a workpiece contained in said holding means being deposited on the said second clamping member and the workpiece being eventually clamped between the said second and first clamping member in its working position spaced from the turntable upon axial displacement of the said turntable and first clamping member towards the said second clamping member, and the workpiece clamped in working position being redeposited in the said holding means and spaced from the clamping members when the said turntable and first clamping member are axially displaced away from the said second clamping member.

8. A device for transporting workpieces to a working position, comprising a disc-shaped turntable rotatable round a vertical pivot axis and having holding means at its upper face for receiving workpieces and an aperture passing through the turntable from each of the said holding means to the lower face of the turntable, a vertical driven spindle rotatably mounted and secured against axial displacement in a fixed machine part below the said turntable, an idle spindle coaxial with the said driven spindle above the said turntable, a stepping device for the said turntable for stepwise rotation thereof into a number of predetermined positions, wherein one of the said holding means and one of the said apertures of the turntable is coaxial with the said driven spindle and idle spindle respectively, means for axail displacement of the turntable, the said idle spindle being coupled with the said means for axial displacement of the turntable so that the idle spindle and the turntable are adapted for common axial displacement relatively to the said driven spindle, an indexing position wherein the turntable is at a level between the driven and idle spindle, and a downward stroke of the said turntable during which the lower driven spindle penetrates through one of the said apertures so that a workpiece accommodated in the associated holding means is deposited on the driven spindle and is subsequently clamped between the driven spindle and the idle spindle by the downward displacement of the latter together with the turntable, the workpiece being thereby clamped in its working position spaced from the turntable.

References Cited in the file of this patent

UNITED STATES PATENTS 2,878,620     Calehuff et al.  ---------- Mar. 24, 1959

FOREIGN PATENTS 1,140,818     France  ---------------- Mar. 4, 1957
1,017,885     Germany  --------------- Oct. 17, 1957